Figure 1:
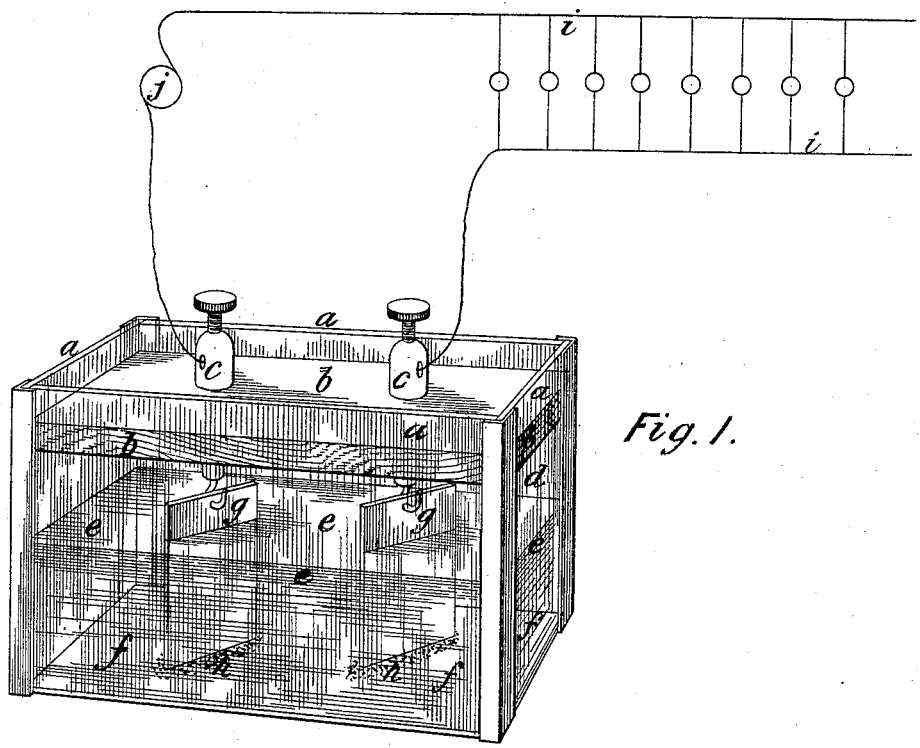

(No Model.) 2 Sheets—Sheet 1.

H. W. KOLLE.
ELECTRIC METER.

No. 411,042. Patented Sept. 17, 1889.

Witnesses
Wm Munn Andrew
C. H. Giles.

Inventor
Harold Werner Kolle,
by Fairfax & Wetter,
Attorneys.

(No Model.)

H. W. KOLLE.
ELECTRIC METER.

No. 411,042. Patented Sept. 17, 1889.

2 Sheets—Sheet 2.

UNITED STATES PATENT OFFICE.

HAROLD WERNER KOLLE, OF LONDON, COUNTY OF SURREY, ENGLAND.

ELECTRIC METER.

SPECIFICATION forming part of Letters Patent No. 411,042, dated September 17, 1889.

Application filed July 30, 1888. Serial No. 281,445. (No model.) Patented in England October 6, 1887, No. 13,561.

*To all whom it may concern:*

Be it known that I, HAROLD WERNER KOLLE, a subject of the Queen of England, residing at London, in the county of Surrey, England, have invented certain new and useful Improvements in Electricity-Meters, (for which I have obtained provisional protection by an application for British Letters Patent filed the 6th day of October, 1887, No. 13,561,) of which the following is a specification.

My invention relates to electricity-meters employed in the measurement of alternating currents.

I have discovered that in a suitable electrolytic cell an alternating current can be used to precipitate metal from one or both of the electrodes, or to cause a chemical union to take place between one or both of the electrodes and the electrolyte. For this purpose I take two masses of lead, copper, or any other suitable metal or alloy and place them in any suitable electrolyte—acid or alkaline—(such as dilute sulphuric acid or caustic potash,) and on passing an alternating electric current through a cell so formed the electrodes lose in weight. This loss being proportional to the current passed through the cell serves as a measure of the same, and the amount of loss of the electrodes may be ascertained in any convenient manner.

The mass of the electrodes may take the form of plates or any other form according to the metal employed and convenience of application.

Owing to its nature or strength the acid or alkaline solution may attack the metal masses immersed therein when the alternating current is not passing through the cell. In this case the amount of action due to the alternating current would be uncertain and it is necessary to eliminate this source of error. This I accomplish by covering the surface of the solution with a layer of oil, paraffine, pitch, tar, or other like substances, whereby the atmosphere is kept from contact with the electrolyte.

The cell from which I have obtained the best results is formed by immersing two copper plates in a dilute solution of sulphuric acid. In the ordinary way of arranging the cell the copper would be attacked by the sulphuric acid and copper sulphate produced; but by adding a small amount of oil, as before mentioned, this is wholly or practically prevented, and no action takes place until the measuring-current is passing through the cell.

I do not confine myself to any particular mode of indicating the loss in weight of the electrodes, as it will be apparent that many forms of devices may be used for this purpose. As an example I may apply a delicate spring-balance to the plates, or hang them to a system of counterweighted levers, which may be furnished with a vernier-scale, so as to indicate at sight the effect of the current passed.

The masses of metal acted upon in the cell may have other kinds of metals or alloys combined with them; or they may be connected to other kinds of metals (also immersed) which are not attacked by the electrolyte, or, if so, only to a small extent. For instance, copper electrodes are suspended in a solution of dilute sulphuric acid by thin platinum strips, (partially or wholly immersed,) and on the passage of an alternating current of electricity a non-conducting or high-resistance film is formed upon the surface of the platinum.

I am aware of a differentiated alternating current being used for measuring purposes; but it is to be understood that I propose to use an ordinary alternating current or currents as now generally employed for electric lighting.

Figure 2:
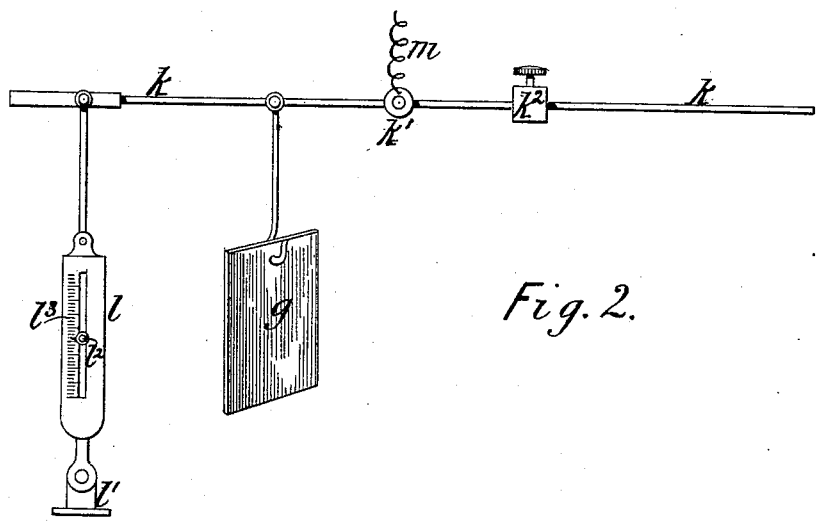
Figure 3:
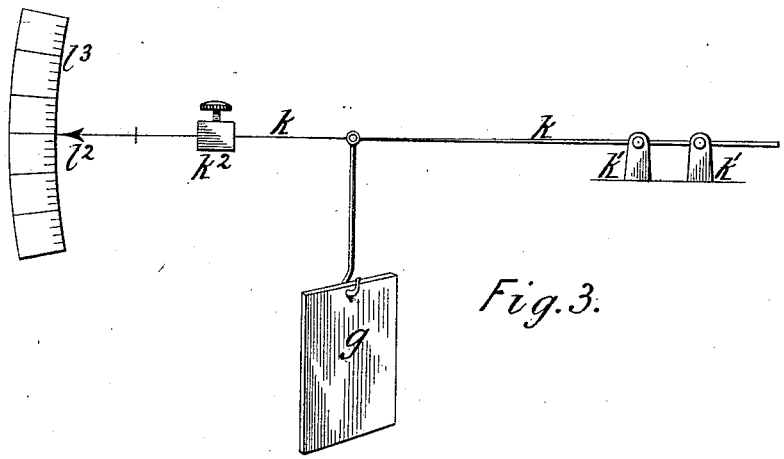
Figure 4:
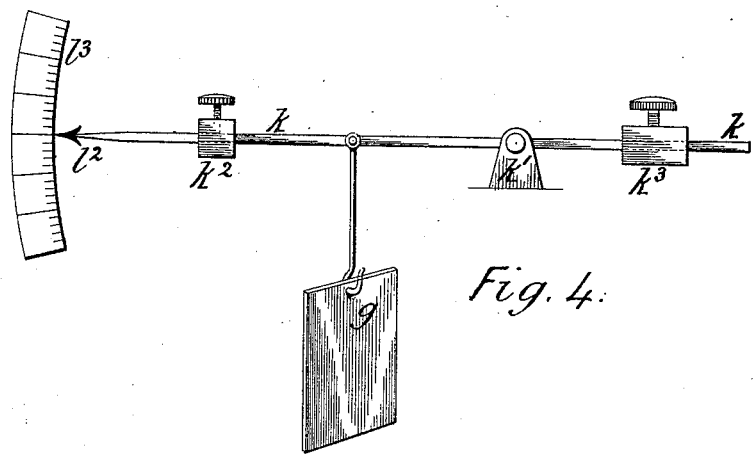

Figure 1 is a perspective view of a cell (supposed to have glass sides) with a diagram of an electric circuit appended thereto. Figs. 2, 3, and 4 are diagrams indicating varying forms of devices for measuring the weight of the electrodes used.

In the accompanying drawings, Fig. 1 represents a cell with glass sides to show the interior plainly, although other material is generally used. *a a* are the sides of the cell. *b* is a top or cover, made of wood or other insulating material; *c c*, the two terminals. *d* is an air-space between *b*, which represents the cover, and *e*, which indicates the layer of oil or other atmospheric sealing material floating upon the top of a dilute solution of sulphuric acid (marked *f*.) Two copper plates *g g* are partially suspended in the solution *f* and are acted upon by the current, and $h$ indicates particles of copper thrown down or precipitated by the current. The lamp-circuit $i\ i$ is indicated in diagram, with an alternating-current generator $j$ and the terminals $c\ c$ placed in the circuit.

In Fig. 2 a means for weighing one of the copper plates $g$ is shown, by suspending the same to a bar $k$, moving upon a pivot or fulcrum $k'$. At one end of the bar $k$ is an adjustable weight $k^2$, and at the other a delicate spring-balance $l$, having upon its face an index-pointer $l^2$ and suitable scale $l^3$. The bottom of the spring-balance $l'$ is attached to a fixed point, which may be a part of the cell or its support. The adjusting-weight $k^2$ is made to bring the weight of the plate $g$ to zero on the scale at starting, and any loss of weight of the electrode or electrodes $g$ will be indicated on the scale. This arrangement may be used to weigh the electrodes in air or in the cell, and if in the latter the current must be brought to the pivot $k'$ by an electrical connection $m$, conducting the current to the plate $g$, while the spring-balance $l$ is insulated from the rod $k$.

Fig. 3 shows a flexible rod $k$, rigidly secured to two fixed points $k'$. An electrode $g$ is similarly attached to the rod $k$, as described for Fig. 2, with an adjustable weight $k^2$ to bring the index-point $l^2$ to zero upon the fixed scale $l^3$. As the electrode loses weight, the index-point $l^2$ rises and traverses the scale through the elasticity of the rod $k$ and thus indicates the amount of current passed through the cell.

Fig. 4 indicates a form of measuring apparatus made by combining the features of Figs. 2 and 3 with a counter-weight $k^3$, and acting for the same purpose as and in a similar manner to those already described.

What I desire to claim and secure by Letters Patent of the United States is—

1. A meter for measuring ordinary alternating currents of electricity, consisting of an electrolytic cell, metallic electrodes suspended therein, a means for indicating the precipitation of metal from the said electrodes, and electric-current connections from the said electrodes to a supply source of ordinary alternating currents of electricity, substantially as and for the purpose herein described.

2. In a meter for ordinary alternating currents of electricity, the combination of two copper plates in a dilute solution of sulphuric acid, an air-sealing layer on the surface of the said solution, electrical connections to the said plates, and a weight-indicating mechanism, substantially as and for the purpose herein described.

In testimony whereof I have signed this specification in the presence of two subscribing witnesses.

HAROLD WERNER KOLLE.

Witnesses:
 EDGAR BLOXHAM,
 J. WELLER.